United States Patent [19]

Hanson

[11] 4,444,176

[45] Apr. 24, 1984

[54] SOLAR ENERGY COLLECTOR

[76] Inventor: Wallace G. Hanson, Rte. 2, Box 103, Dodge Center, Minn. 55927

[21] Appl. No.: 295,749

[22] Filed: Aug. 24, 1981

Related U.S. Application Data

[62] Division of Ser. No. 12,838, Feb. 16, 1979, Pat. No. 4,297,988.

[51] Int. Cl.³ .............................................. F24J 3/02
[52] U.S. Cl. ..................................... 126/439; 350/293
[58] Field of Search ................ 126/441, 439; 350/292, 350/293, 294, 299

[56] References Cited

U.S. PATENT DOCUMENTS

| | | |
|---|---|---|
| 2,625,930 | 1/1953 | Harris . |
| 3,285,333 | 11/1966 | Johnson, Jr. . |
| 3,923,381 | 12/1975 | Winston . |
| 3,964,464 | 6/1976 | Hockman . |
| 3,982,527 | 9/1976 | Cheng . |
| 4,002,499 | 1/1977 | Winston .......................... 126/439 X |
| 4,003,364 | 1/1977 | Balkus, Jr. . |
| 4003,638 | 1/1977 | Winston . |
| 4,007,729 | 2/1977 | Chao . |
| 4,019,496 | 4/1977 | Cummings . |
| 4,079,724 | 3/1978 | Zwillinger . |
| 4,162,824 | 7/1979 | Ma . |
| 4,222,370 | 9/1980 | DeGeus .......................... 350/299 X |
| 4,228,789 | 10/1980 | Kay .................................. 126/441 X |

Primary Examiner—Samuel Scott
Assistant Examiner—Randall L. Green
Attorney, Agent, or Firm—Paul L. Sjoquist

[57] ABSTRACT

Disclosed are structures for collection and concentration of solar energy, each including one or more longitudinally extending, cusp-like modules made up of apposed reflectors of any desired length. The reflectors comprise ruled surfaces and are arranged to converge from entrance to exit apertures. One reflector in each module is concave, and the modules are asymmetric in section, although two asymmetric modules may be combined in a system which is itself symmetrical. A pair of modules may be combined to have a common plane reflector, and the pairs may be further combined if desired. The modules are supported and oriented according to the latitude of the installation, to obtain intense solar energy concentration, which is accomplished totally without diurnal tracking.

4 Claims, 11 Drawing Figures

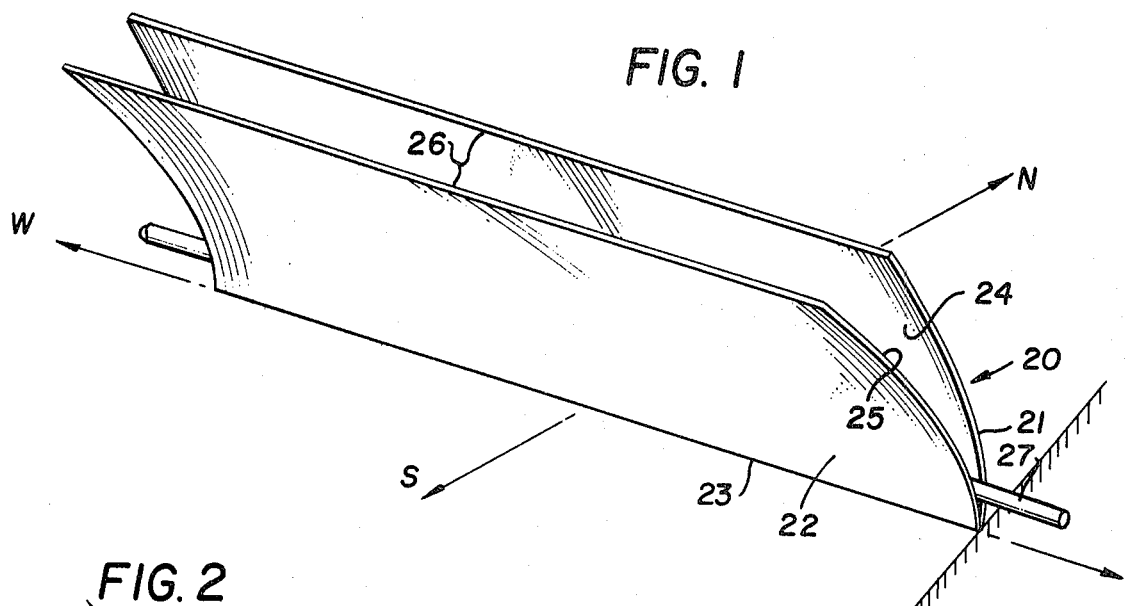
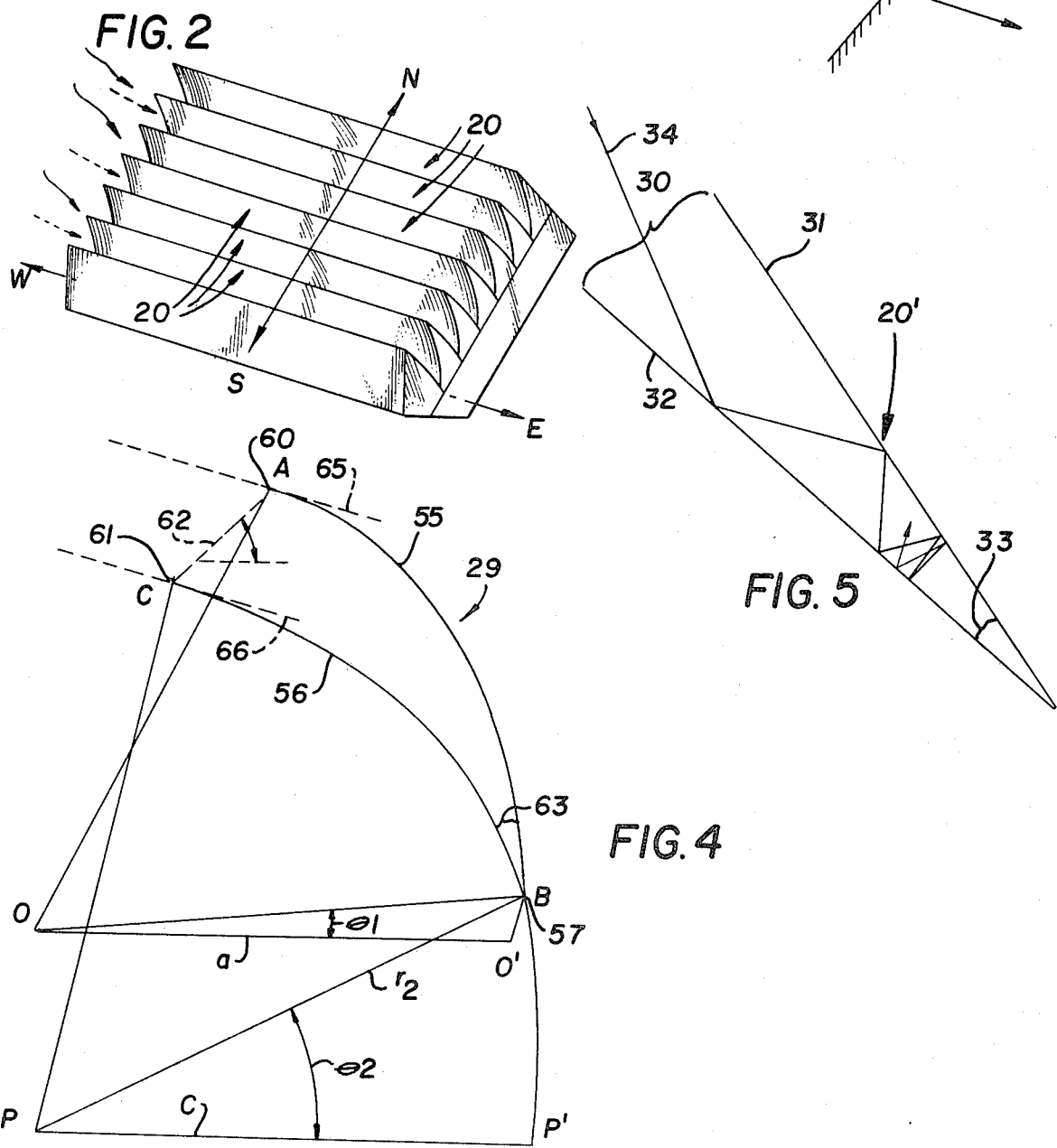

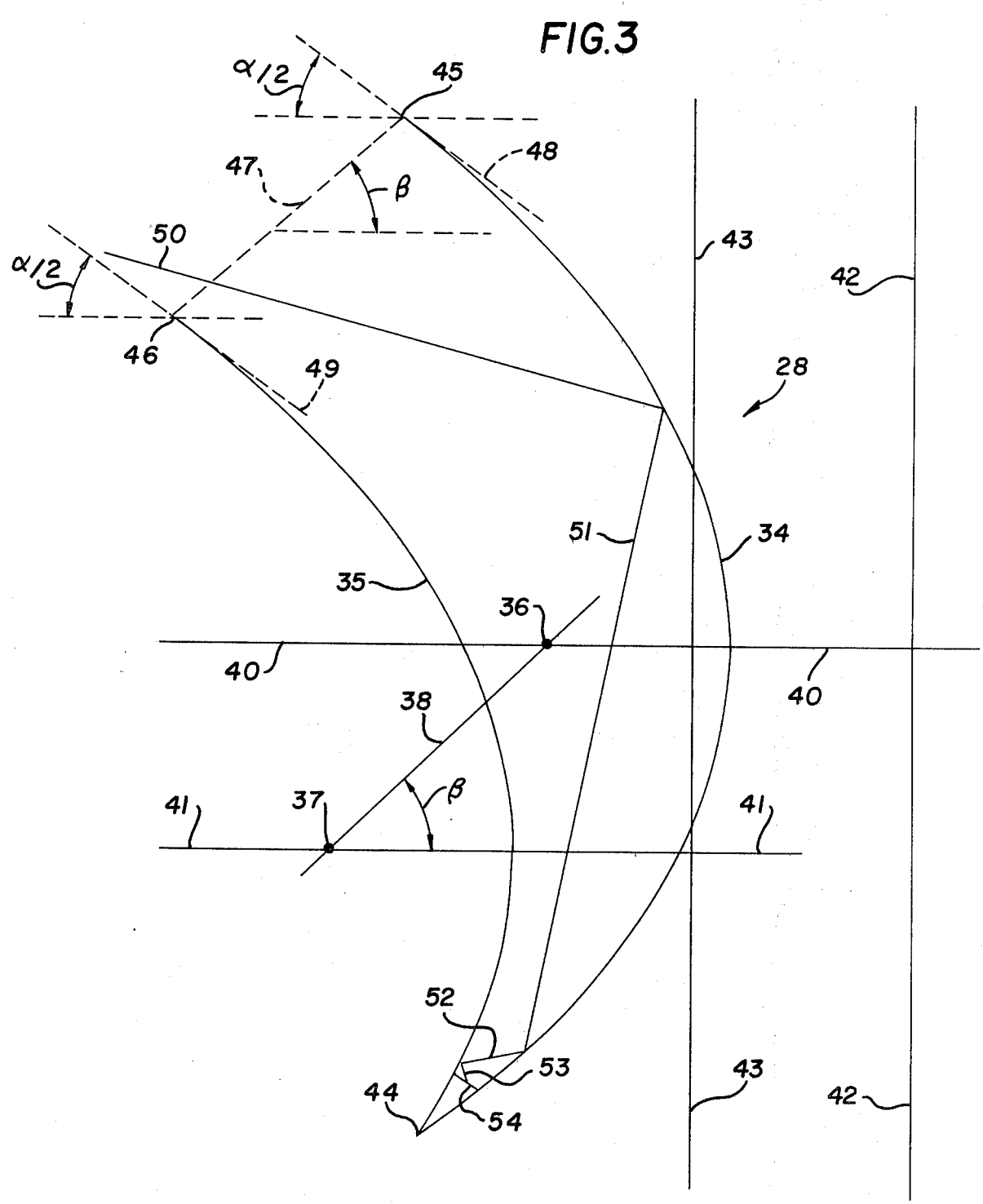

SOLAR ENERGY COLLECTOR

This is a division of application Ser. No. 012,838, filed Feb. 16, 1979 now U.S. Pat. No. 4,297,988.

BACKGROUND OF THE INVENTION

This invention relates to the field of optical engineering, and particularly to the design of efficient, cost-effective solar energy collectors. Sunlight falling on the earth represents a source of radiant energy, even though at any location on the earth it is not continuous, being cyclically interrupted in accordance with the diurnal rotation of the earth.

Radiant energy from the sun reaches the unclouded earth at a maximum flux density of about 1000 watts per square meter of surface impinged perpendicularly. Solar energy at this natural intensity is suitable for numerous purposes, including lighting and photosynthesis, but is not in a form readily usable for a large number of other applications.

Much thought has been devoted to developing apparatus for converting solar radiant energy to other forms of energy which are more generally useful. Devices for performing this function are known as solar collectors, and simple collectors may do no more than accept radiant energy at its natural intensity and enable it to fall on absorbent material, thereby converting it to thermal energy which is then used to raise the temperature of a suitable, usually liquid, heat transport medium. Flow of the medium transports the heat energy to a more or less distant point of use. A typical apparatus of this sort is known as a flat-plate collector. The problems caused by periods of darkness intervening between periods of insolation, and by the frequent presence of cloud cover, are common to all solar energy collection systems, but are not addressed as a part of the present invention and will not be considered further here.

For many applications, the flux density of solar radiant energy is inadequate: efficient power generation with superheated steam is one example. To meet the demands of such applications, solar collectors have been designed which increase the effective flux density by concentrating the energy incident at an entrance aperture of a first area, so that it is directed to an exit aperture of considerably smaller area where an energy absorber or other useful receiver is located. For example, if the energy at normal intensity reaching an entrance aperture thirty centimeters wide is concentrated to reach an exit aperture three centimeters wide and of the same length, the energy at the exit aperture has a flux density ten times as great as that at the entrance aperture, assuming no loss of energy during concentration. In this discussion it is to be understood that the effective size of an aperture is not measured directly by its physical dimensions, but rather by the components of those dimensions normal to the direction of incident energy, that is, to the "sun line".

The direction of the sun from any point on the earth's surface is not constant. It varies both in altitude and in azimuth from sunrise to sunset, and it also varies seasonally. At 40° north or south latitude the sun's altitude varies from 0° at sunrise to a maximum angle of 73.4° at noon of the summer solstice.

Any square meter of collector surface fixed to the earth, even if perpendicular to the sun line at a particular time of a particular day, is for most daylight hours not perpendicular to that line, and thus effectively represents less than a square meter of entrance aperture. With respect to this problem, solar energy collectors may be divided into two categories defined broadly as tracking collectors and non-tracking collectors, both categories being capable of design to concentrate the radiant flux density.

A tracking collector is one which is mounted for movement with respect to the earth's surface, and in which the collector is moved by a diurnal tracking mechanism to keep it pointed directly at the sun as it apparently moves through the heavens, so that the entire aperture is always perpendicular to the sun line from morning to night, and hence is always of maximum effective area. The requirement for tracking movement of the collector obviously places practical limitations on the area of the collector.

A non-tracking collector is one which is fixed to the earth, and is therefore subject to diurnal change in effective entrance aperture. It is not, however, subject to practical limitations as to physical size, which therefore becomes limited only by the area available for use and the cost of materials and labor. A typical non-tracking collector comprises one or more sets of elongated reflectors each concentrating energy from the sun on an elongated narrow receiver such as a water pipe. The reflectors and receivers extend east and west, and may be constructed in banks oriented at an angle which deviates from the horizontal in accordance with the latitude of the location.

In a tracking collector the upper limit of concentration is accomplished when all the radiant energy received at the entrance aperture is focused or imaged at the exit aperture, where a suitable energy receiver is positioned. Application, to non-tracking collectors, of the optical principles of focusing of energy does not give promise of sufficiently great multiplication of the flux density from entrance to exit apertures.

It is possible, however, to design a solar collector that concentrates the rays of the sun but does not focus them. Such a device is called a non-imaging collector, and to forego imaging is to gain a degree of design freedom that can be put to useful ends.

Non-imaging, non-tracking collectors are not without problems, however. First, a collector of this sort for full coverage must be designed with an acceptance angle at least as great as the range of the sun's altitude angle, or some of the radiant energy will escape collection. Second, reexit of rays which have entered the collector must be prevented, as such rays are lost to the collector and reduce the flux density at the exit aperture.

SUMMARY OF THE INVENTION

The present invention is directed to non-imaging, non-tracking solar energy collectors having energy reflectors of improved design whereby reexit of energy which has passed in through the entrance aperture is substantially reduced, or in some embodiments is eliminated. This design includes pairs of reflectors of particular curvature, orientation, and apposition. The reflectors are elongated in an east-and-west direction, and are configured as convergent surfaces comprising apposed portions of intersecting ruled surfaces defined by parallel generatrices, not more than one of the surfaces being concave, and the entrance apertures being arranged to give acceptance angles which match the apparent local altitude range of the sun from the horizon to its zenith.

Several embodiments of the invention are shown, including pairs of reflectors whose apposed surfaces are convex and concave conic sections or convex and concave spirals. Also included are pairs of surfaces having sections one of which is linear and the other of which is concave: these pairs can be grouped with their plane surfaces in coincidence, and the groups themselves can be further combined. Arrangements are also disclosed in which one of the surfaces may in section be complex rather than a single curve, or may be discontinuous. Common to all these arrangements is the characteristic that the working surfaces of any pair are converging and asymmetrical. It is intended that a plurality of such reflective pairs or groups may be assembled in a properly oriented bank of any desired length, according as the energy demands of the application required.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing, FIG. 1 is a schematic showing of a generalized collection module according to my invention;

FIG. 2 is a fragmentary schematic showing of a solar collector using modules according to FIG. 1;

FIG. 3 gives details of the configuration of the reflectors for one module according to the invention, using surfaces of parabolic section;

FIG. 4 is a view similar to FIG. 3 using surfaces of spiral section;

FIG. 5 is a sketch illustrative of the manner of loss of energy in concentrators using plane reflectors;

DESCRIPTION OF THE PREFERRED EMBODIMENTS

Figure 6:
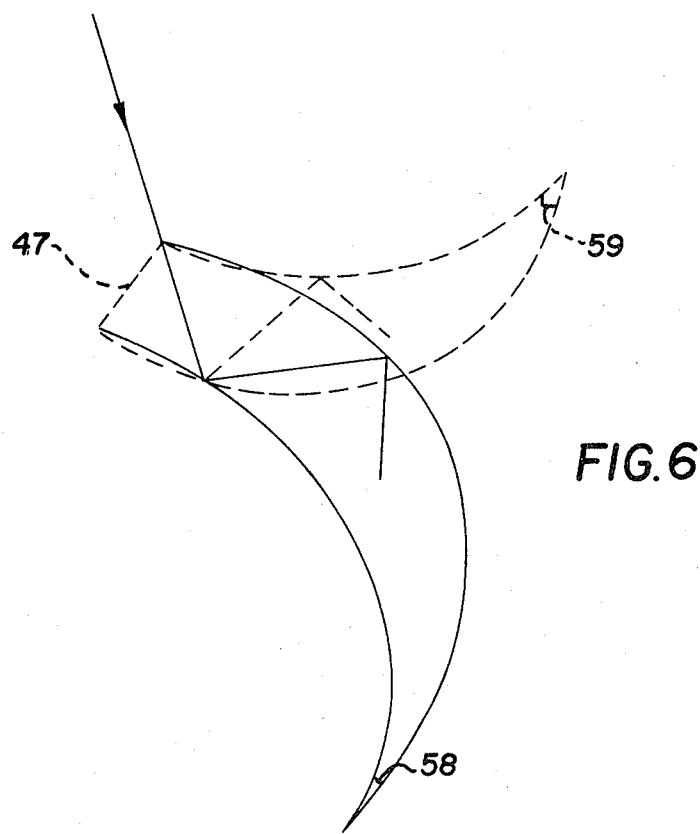
FIG. 6 shows how a module according to the invention having a desired entrance aperture may have either of two spatial orientations.

A generalized module 20 for solar collectors embodying my invention is shown in FIG. 1 to comprise first and second reflectors 21 and 22 having the form of ruled surfaces and so configured that they intersect along a line 23, or would so intersect if extended. The apposed inner surfaces 24, 25 are those which receive solar energy at an entrance aperture 26 and by reason of their special configuration direct it to an exit aperture here represented as the site of a conduit 27 for liquid to be heated. A module is to be positioned with the line 23 extending horizontally east and west: the compass directions shown in FIG. 1 are for northern hemisphere operation. It is clear that the length of such a collector is limited solely by the available space and the cost of labor and materials for its construction. The gain in flux density is not high in this structure. It is, however, admirably adapted to assembly in a bank of such structures, as is suggested in FIG. 2, and such a bank of course can also be as long as desired.

A cross section of collector 20 perpendicular to line 23 has the configuration of a rhamphoid cusp, and it is a characteristic of my invention that only one of the reflectors can be concave: the other must be plane or convex. FIG. 3 shows how such a cusp 28 can be defined by a pair of cylindrical paraboloids, and FIG. 4 shows a cusp 29 defined by a pair of cylindrical spiraloids.

Attention is first directed however, to FIG. 5, which is supplied to illustrate the loss of energy entering a collector 20' at an entrance aperture 30 between plane reflectors 31 and 32 for collection at an exit aperture 33. The path of a typical ray 34 is traced, and it is seen that after multiple reflections, the ray direction reverses, to re-exit from this collector. Thus, for exit aperture 33, ray 34 lies outside the acceptance angle of the solar collector 20'. The acceptance angle of 20' may be increased by widening the angle between reflectors 31 and 32, or by moving exit aperture 33 toward entrance aperture 30, but in both cases concentration will be lessened. The same effect may be noted in collectors where both of a pair of apposed reflectors are concave, and in imaging collectors when not aimed at the sun.

Unless otherwise stated, in the discussions which follow, it will be assumed for illustrative purposes that the collector is being designed for use at 40° north latitude, where the solar altitude varies from 0° to a maximum of 73.4°. In the drawing $\beta$ will be used to identify latitude angle, and $\alpha$ will be used to identify the maximum solar altitude angle, which of course is different for different latitudes, and may, near the equator, be more than ninety degrees.

FIG. 3 shows a cusp 28 defined by a pair of identical parabolic arcs 34 and 35 having, respectively, foci 36 and 37 spaced along a line 38 making the latitude angle with the horizontal, horizontal axes 40 and 41, and directrices 42 and 43, so that they intersect at point 44. Arc 34 continues from point 44 to a point 45, and arc 35 continues from point 44 to a point 46. Points 45 and 46 define the ends of the entrance aperture 47 of this cusp, which preferably makes the latitude angle $\beta$ with respect to the horizontal. One way to accomplish this is to so choose points 45 and 46 that the tangents 48 and 49 to the respective curves at these points both make with the horizontal an angle $\alpha/2$ equal to half the maximum solar altitude.

A typical ray 50 entering this cusp is traced on the curve through segments 51, 52 and 53 toward an exit aperture 54, where an appropriate energy receiver may be located.

A further point should be made at this time. The solar energy reaching the earth at dawn, and at dusk, is considerably attenuated by its increased path through the atmosphere. For some applications it may be wiser to reduce the acceptance angle and reposition the collector so that it collects between say 15° and 73.4° altitude: such a modification could result in more effective conversion of the solar energy during the hours when atmospheric attenuation is least, and hence result in an overall improvement in the conversion, the reduction in hours being more than compensated by greater energy output during the shorter period.

The similar option is available of constructing the collector so that α is the maximum solar altitude during the winter, if the application is such that summer use is not intended. Here again an increased effectiveness during the actual period of use may more than compensate for the accompanying loss in generality.

FIG. 6 is presented to show schematically that a cusp having an entrance aperture 47 may be constructed of apposed concave and convex curves, to curve either downwardly, as shown in solid lines, or upwardly, as shown in broken lines, the exit apertures 58 and 59 respectively being also shown.

FIG. 4 schematically shows a cusp 29 defined by a pair of arcs 55 and 56 of Archimedian spirals which intersect at point 57. The origin for spiral 55 is at 0; the curve crosses the X-axis of origin O at 0', spaced from 0 by a distance a, and its radius vector $r_1$ in the first quadrant about 0 has the value $$r_1 = a + k_1 \theta_1 \quad (1)$$

The origin for spiral 56 is at P; the curve crosses the X-axis of origin P at P', spaced from P by a distance c, and its radius vector $r_2$ in the first quadrant about P has the value $$r_2 = c + k_2 \theta_2. \quad (2)$$

In considering these two equations, c is greater than a, and $k_2$ is greater than $k_1$: the axes of ordinates through origins O and P are vertical and coincide, and P is below O. The curves are continued to points 60 and 61, and the line 62 joining these points is the entrance aperture: as in FIG. 3, the entrance aperture 62 preferably makes the latitude angle θ with the horizontal. The tangents 65, 66 to the curves at points 60 and 61 make, with the horizontal, angles equal to half the difference between the latitude angle and the maximum solar angle, that is $(\beta - \alpha)/2$.

Energy entering aperture 62 progresses by multiple reflection to an exit aperture 63, where an appropriate energy receiver may be located.

Figure 7:
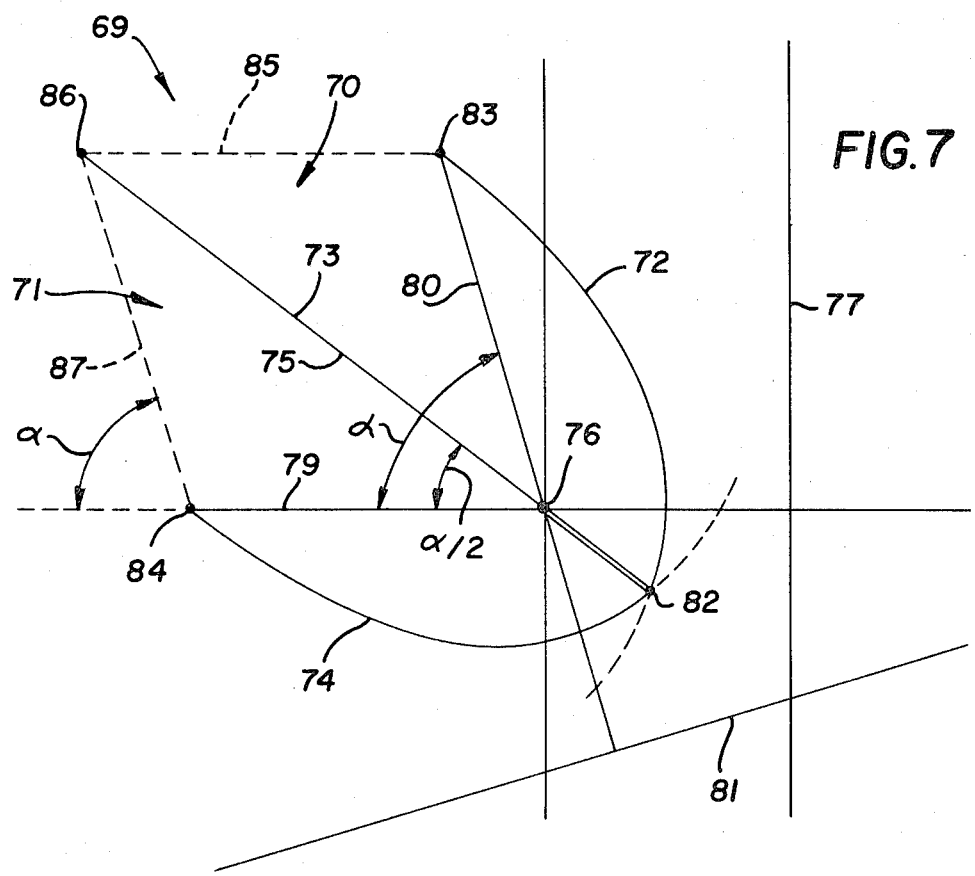
FIG. 7 shows a collector in which two pairs of reflectors share a plane surface.

The cusps shown in FIGS. 3 and 4 are of course, cross sections of modules as exemplified in FIG. 1, and can be extended indefinitely in a direction perpendicular to the section plane. In each the energy enters the space between convex and concave reflectors. Attention is now directed to FIG. 7, which illustrates in section a collector 69 of two cusps 70 and 71. The first cusp includes a concave parabolic reflector 72 above a plane reflector 73, while the latter cusp includes a concave parabolic reflector 74 below a plane reflector 75 which is in fact the opposite surface of reflector 73. Reflector 72 comprises a parabolic arc of which the focus is at 76 and the directrix is at 77, the axis 79 of the parabola being horizontal. Reflector 74 is a parabolic arc of which the focus is also at 76, but the axis 80 of the parabola makes with the horizontal an angle α equal to the maximum solar altitude: the directrix of arc 74 is at 81, and makes with directrix 77 an angle equal to the supplement of angle α. The arcs intersect at point 82, and the exit apertures of both cusps are defined by the line 76–82 which lies in the plane of reflectors 73 and 75. Curves 72 and 74 terminate at points 83 and 84, their respective intersections with axes 80 and 79 respectively. These points are so located that a horizontal line 85 through point 83 intersects the plane of reflectors 73 and 75 at the same point 86 as does the line 87 passing through point 84 at an angle α, equal to the maximum solar altitude. The plane of reflectors 73 and 75 then makes with the horizontal an angle α/2 equal to half the maximum solar altitude angle. Bidirectional energy receiving means may be located at the line 76–82.

It should be pointed out at this time that while the preferred terminal points of various reflectors have been specifically recited in connection with FIGS. 3, 4 and 7, variations in their location to modify the entrance apertures and acceptance angles of the cusps may affect the flux density provided by the collectors, but not their operativeness.

The entrance aperture of cusp 70 is line 85, and that of cusp 71 is line 87. Each cusp has its individual acceptance angle, but the two overlap so that the joint acceptance angle extends from 0 to α degrees. My studies have shown that, assuming perfect reflection from specular surfaces, a pair of cusps as just described concentrate all of the direct solar radiation impinging upon apertures 85 and 87 and direct it totally upon the collection surfaces lying between point 76 and 82 without loss throughout the day and throughout the year.

Figure 8:
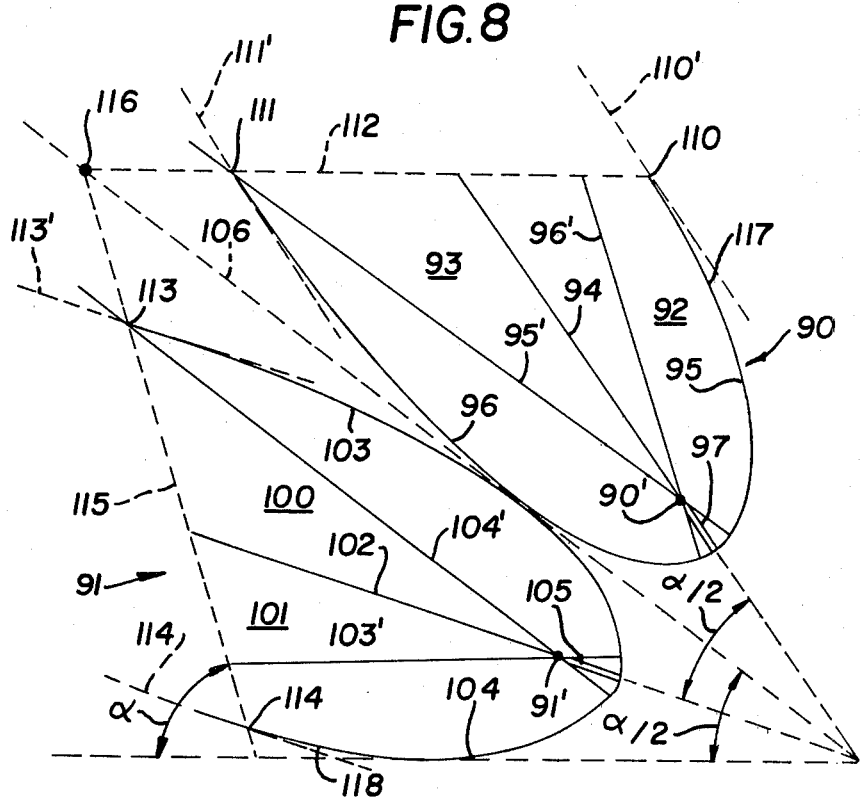
FIG. 8 shows how two collectors of the type shown in FIG. 7 can be combined to advantage.

This improvement can be carried forward, with the same total efficiency and with greater concentration, as suggested schematically in FIG. 8, which shows a pair of collectors 90 and 91 each generally like a collector 69 of FIG. 7. Collector 90 is of two cusps 92 and 93, comprising a central plane, bilateral reflector 94 between upper and lower concave reflectors 95 and 96 comprising portions of parabolas having a common focus 90' and axes 95' and 96' respectively: its exit aperture is shown at 97. Collector 91 is of two cusps 100 and 101 comprising a central plane bilateral reflector 102 between upper and lower concave reflectors 103 and 104 comprising portions of parabolas having a common focus 91' and axes 103' and 104' respectively: its exit aperture is shown at 105. Planes 94 and 102 intersect at a dihedral angle α/2, and the bisector 106 of this angle makes an angle α/2 with respect to the horizontal. Axis 103' is horizontal, axis 96' is at the maximum altitude angle α, and axes 95' and 104' are parallel with bisector 106. In one embodiment of the invention arcs 95 and 96 terminate at points 110 and 111, at which tangents 110' and 111' to curves 95 and 96 are parallel to the plane of reflector 94, and arcs 103 and 104 terminate at points 113 and 114, at which tangents 113' and 114' to curves 103 and 104 are parallel to the plane of reflector 102. Points 110 and 111 lie in a horizontal line 112, and points 113 and 114 lie in a line 115 which makes the maximum solar altitude angle α with respect to the horizontal, lines 112 and 115 intersecting bisector 106 at a common point 116. Reflectors 94 and 102 terminate at lines 112 and 115 respectively. In another embodiment of the invention arcs 95 and 104 may be terminated nearer their respective foci, as at points 117 and 118, respectively.

Further improvement in concentration is possible with further subdivision into more collectors than two, and by modification of the reflecting surfaces as will be discussed in connection with FIGS. 10 and 11.

Figure 9:
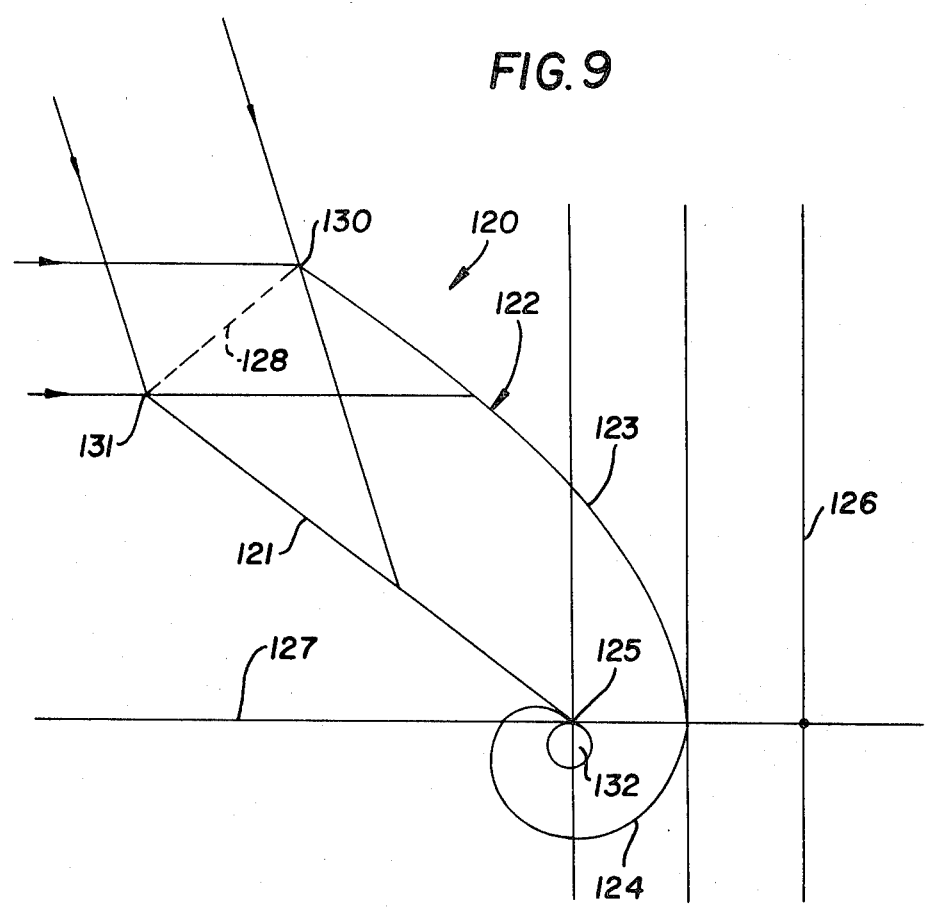
FIG. 9 shows a module in which one reflector is in section a complex curve.

FIG. 9 is a sectional view of a collector in the form of a modified cusp 120 made up of a plane reflector 121 and a concave reflector 122 which is a composite of a parabolic arc 123 and a composite circular and spiral arc 124. Arc 123 has a focus 125, a directrix 126, and a horizontal axis 127. The entrance aperture 128 of the collector is between point 130 on reflector 123 and point 131 on reflector 121, only the upper surface of which is utilized. The exit aperture in this collector is occupied by an energy receiver 132.

Figure 11:
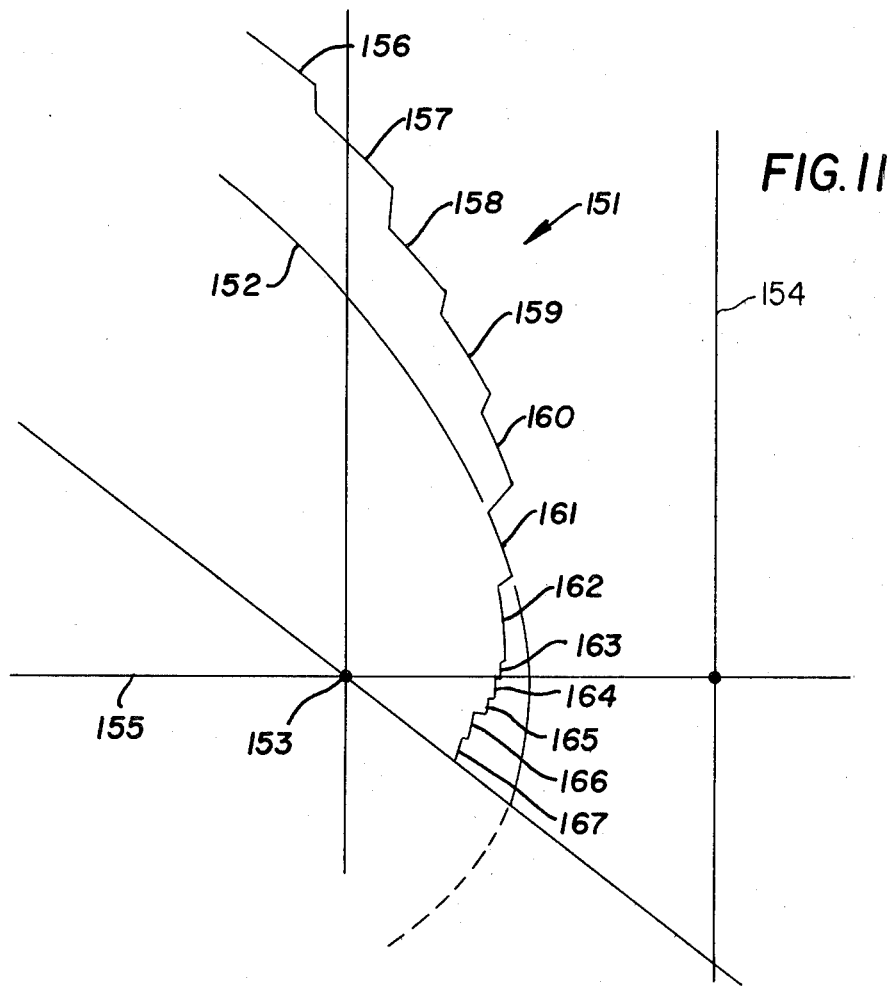
FIG. 11 shows that for large installations a reflector may be constructed of arcs of a single parabola translated in space in analogy to a Fresnel lens.
Figure 10:
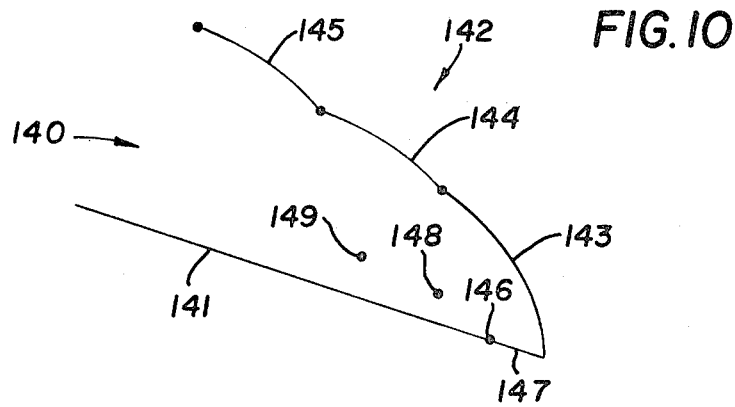
FIG. 10 shows that one reflector may be in section a composite of three parabolas.

FIGS. 10 and 11 are presented to suggest further embodiments which my invention may take. FIG. 10 shows a sectional view of a cusp 140 having a plane reflector 141 and a generally concave reflector 142 made up of arcs 143, 144 and 145 of three parabolas. The focus of arc 143 is at point 146, in the plane of reflector 141, as has been previously described, and the exit aperture of the collector is shown at 147. The foci of arcs 144 and 145 are at points 148 and 149, selected at the discretion of the designer. I have found that this modification of the structure may in some instances result in a greater flux density at receiver 147 than is available from a single curve.

Finally, FIG. 11 is presented to show that it is not necessary for the concave reflector to be continuous. The basis for the reflector 151 of this figure is a parabola 152 with a focus 153, a directrix 154 and a horizontal axis 155. The actual reflector is made up of segments 156, 157, 158, 159, 160, 161, 162, 163, 164, 165, 166 and 167. Segment 161 coincides with parabola 152. The other segments may be spaced laterally from parabola 152, either inwardly or outwardly, in what may be considered an analogy to the well known Fresnel lens. It is understood that the portions of the broken line 156–167 between the numbered segments have no optical effect: they may be construction members or even may be omitted if this is appropriate. The solar energy falling on them is not collected, but the purpose of my invention here is not to gather as much energy as possible, but rather to increase the energy density at an exit aperture as much as possible. Segments 156–167 may be planes positioned to approximate the paraboloid without unacceptable loss of concentration, a possibility which may be advantageous if reflectors of large dimensions are to be constructed of simple components.

From the above it will be evident that I have invented a new and improved solar collection module, made up of a pair of asymmetrical reflectors converging from an entrance aperture to an exit aperture, and comprising apposed portions of reflecting surfaces not more than one of which is concave. The surfaces may be geometrically defined as ruled surfaces defined by parallel generatrices, and may be paraboloidal or spiraloidal: only one of the reflectors may be plane. In a very useful form of the invention the modules are used in pairs, with two plane reflector surfaces coincident. The structure is well adapted for installations of large dimensions, either linearly or in area.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A stationary solar concentrator, fixed with respect to the earth comprising:
    a collector module having entrance apertures and having two bidirectional energy receivers;
    means for concentrating onto one or both said bidirectional energy receivers rays of the sun incident to said entrance apertures, comprising a first, a second, a third and a fourth cusp; said first and said second cusps comprising concave reflectors opposing a first plane reflector; said first plane reflector comprising, respectively, the obverse and reverse faces of a central plane bilateral reflector lying in a first plane forming with the horizontal a dihedral angle equal to three-fourths the maximum summer angle of apparent elevation of the sun; said third and fourth cusps comprising concave reflectors opposing a second plane reflector; said second plane reflector comprising, respectively, the obverse and reverse faces of a second central plane bilateral reflector lying in a second plane forming with the horizontal a dihedral angle equal to one-fourth the maximum summer angle of apparent elevation of the sun.

2. The collector module according to claim 1 further comprising:
    each of said concave parabolic reflectors respectively describing in cross section a parabolic arc,
    each of said parabolic arcs having a focus and an axis,
    each of said foci lying in one of said planes,
    the axis of the first of said parabolic arcs being inclined to the horizontal at an angle equal to one-half the maximum summer angle of apparent elevation of the sun at the geographic situs of the concentrator,
    the axis of the second of said parabolic arcs being inclined to the horizontal at an angle equal to the maximum summer angle of apparent elevation of the sun at the geographic situs of the concentrator,
    the axis of the third of said parabolic arcs being horizontal,
    the axis of the fourth of said parabolic arcs being inclined to the horizontal at an angle equal to one-half the maximum summer angle of apparent elevation of the sun at the geographic situs of the concentrator.

3. The collector module according to claim 1 further comprising:
    four cusps, each cusp comprising a plane reflective surface and a generally concave reflective surface,
    each said generally concave surface describing in cross section segments of parabolas, said parabolas intersecting one another, each of said segments lying along a generally arced line.

4. A stationary solar concentrator, fixed with respect to the earth, comprising:
    a collector module having entrance apertures and having two bidirectional energy receivers,
    means for concentrating onto one or both said bidirectional energy receivers, rays of the sun over a reduced acceptance angle, comprising
    a first, a second, a third and a fourth cusp,
    said first and said second cusps comprising concave parabolic reflectors opposing a first plane reflector,
    said first plane reflector comprising the obverse and reverse surfaces of a first central plane bilateral reflector lying in a first plane,
    said third and fourth cusps comprising concave parabolic reflectors opposing a second plane reflector,
    said second plane reflector comprising the obverse and reverse surfaces of a second central plane bilateral reflector lying in a second plane, said first plane forming with the horizontal a dihedral angle coincident with the angle of apparent elevation of the sun after three-fourths of its apparent excursion within said reduced acceptance angle,
said second plane forming with the horizontal a dihedral angle coincident with the angle of apparent elevation of the sun after one-fourth of its apparent excusion,
each said concave parabolic reflector, respectively describing in cross section a parabolic arc,
each said parabolic arc, respectively, having a focus lying in one of said planes.

* * * * *